United States Patent
Kim et al.

[11] Patent Number: 5,889,571
[45] Date of Patent: *Mar. 30, 1999

[54] ULTRAVIOLET IRRADIATING DEVICE FOR PHOTO-ALIGNMENT PROCESS AND AN IRRADIATING METHOD USING THE SAME

[75] Inventors: Jong Hyun Kim; Ki Hyuk Yoon; Joung Won Woo, all of Seoul; Mi Sook Nam; Yoo Jin Choi, both of Anyang-shi; Jin Hee Jung, Seoul, all of Rep. of Korea

[73] Assignee: LG Electronics Inc., Seoul, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 792,265

[22] Filed: Jan. 31, 1997

[30] Foreign Application Priority Data

Feb. 1, 1996 [KR] Rep. of Korea ............ 1996 2463
Aug. 30, 1996 [KR] Rep. of Korea ............ 1996 37076

[51] Int. Cl.⁶ .................................. G02F 1/1357
[52] U.S. Cl. ...................................... 349/124
[58] Field of Search ............................ 349/124

[56] References Cited

U.S. PATENT DOCUMENTS

| | | | |
|---|---|---|---|
| 5,464,669 | 11/1995 | Kang et al. | 349/124 |
| 5,576,862 | 11/1996 | Sugiyama et al. | 349/124 |
| 5,604,615 | 2/1997 | Iwagoe et al. | 349/124 |
| 5,623,354 | 4/1997 | Lien et al. | 349/124 |
| 5,657,105 | 8/1997 | McCartney | 349/124 |

FOREIGN PATENT DOCUMENTS

| | | |
|---|---|---|
| 0491368 | 6/1992 | European Pat. Off. . |
| 0 632 311 | 1/1995 | European Pat. Off. . |
| 0 742 471 | 11/1996 | European Pat. Off. . |
| 0 750 212 | 12/1996 | European Pat. Off. . |
| 1489816 | 10/1977 | United Kingdom . |
| 2046928 | 11/1980 | United Kingdom . |
| 2215477 | 9/1989 | United Kingdom . |
| 2 281 977 | 3/1995 | United Kingdom . |
| 2 286 893 | 8/1995 | United Kingdom . |
| 2286894 | 8/1995 | United Kingdom . |

OTHER PUBLICATIONS

T. Hashimoto et al. "TN–LCD with Quartered Subpixels Using Polarized UV–Light–Irradiated Polymer Orientation Films", (SID 95 Digest) pp. 877–880.

M. Schadt et al. "Surface–Induced parallel Alignment of Liquid Crystals by Linearly Polymerized Photopolymers", Jpn. J. Appl. Phys. vol. 31(1992) part 1, No 7, Jul. 1992, pp. 2155–2164.

*Primary Examiner*—William L. Sikes
*Assistant Examiner*—Toan Ton
*Attorney, Agent, or Firm*—Finnegan, Henderson, Farabow, Garrett & Dunner, L.L.P.

[57] ABSTRACT

A photo-irradiating apparatus includes a UV lamp generating the UV light, a lens, a polarizer in which the UV light is linearly polarized, and a substrate exposed by the linearly polarized UV light. The UV lamp, the lens, and the polarizer are arranged in a line. The UV light is irradiated into the alignment layer during the moving of a scan motor to irradiate the whole area of the alignment layer uniformly. In addition, the light is obliquely irradiated into the alignment layer so that the area exposed to the light is enlarged.

21 Claims, 6 Drawing Sheets

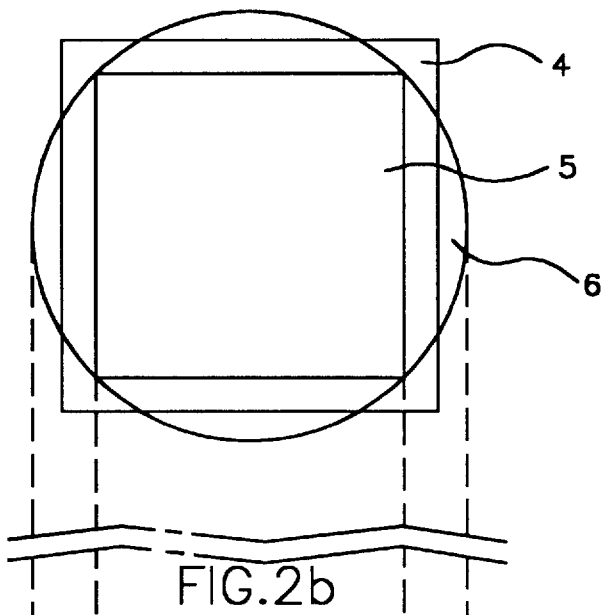
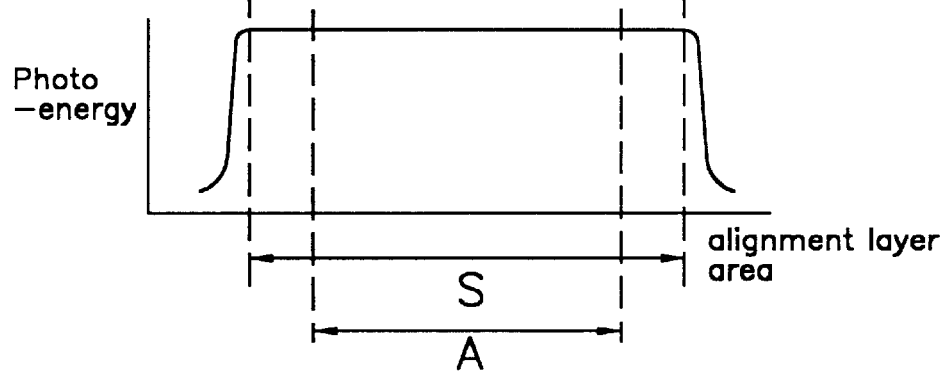

ULTRAVIOLET IRRADIATING DEVICE FOR PHOTO-ALIGNMENT PROCESS AND AN IRRADIATING METHOD USING THE SAME

BACKGROUND OF THE INVENTION

The present invention relates to an ultraviolet irradiating device and related method, and more particularly to an apparatus for a photo-alignment process in which the UV light is uniformly and widely irradiated into the alignment layer to obtain a large size liquid crystal display.

A conventionally used liquid crystal display is mainly a twisted nematic liquid crystal display (referred as TNLCD), which has a changeable transmittance at each gray level according to the viewing angle. In particular, while the transmittance is symmetrical in the horizontal direction, the transmittance is asymmetrical in the vertical direction. Therefore, in the vertical direction, a range with an inverted image phenomenon occurs so that the vertical viewing angle becomes very limited.

To overcome this problem, a multi-domain liquid crystal cell, in which a pixel is divided into more than two pretilts where the pretilt defines pretilt angle and pretilt direction, is introduced.

However, manufacturing the multi-domain liquid crystal cell by the conventional method, a reverse rubbing method, is too complicated because it comprises the following steps: rubbing the entire alignment layer in a first rubbing direction; applying a photoresist as a mask for blocking one domain; rubbing the other domain in a reverse direction to the first rubbing direction; and removing the photoresist. Using a reverse rubbing process generates dust and/or an electrostatic discharge, thus reducing productivity and/or damaging the thin film transistor which drives a pixel. In addition, to eliminate an image inversion phenomenon completely, each pixel is divided into more than 4 domains. However, it is exceedingly difficult to fabricate a 4-domain liquid crystal cell by this reverse rubbing technique.

As another alignment method, a photo-alignment method is used. In this method, since the pretilt, defining a pretilt angle and a pretilt angle direction, is determined on the alignment layer by irradiating UV light instead of a rubbing process, the fabricating process is simple and the damage to the substrate can be prevented. By irradiating light into the alignment layer, which includes a photopolymer, the photopolymer is photopolymerized by the cross linking generated between the polymers. Therefore, a pretilt on the alignment layer is determined according to the direction and the degree of cross linking of the photopolymers; the cross linking depending on the polarization direction, the incident direction of the light, and the amount of photo-energy of the light absorbed into the alignment layer. In other words, the direction and the magnitude of the pretilt are determined according to the polarization direction of the UV light and the photo-energy absorbed into the alignment layer. Indeed, to make a multi-domain liquid crystal cell, each domain is respectively exposed to UV light having a different polarization direction and a different photo-energy. Therefore, it is important to conform the uniformity of photo-energy absorbed into the alignment layer as well as the size of the spot of the light to make a large size liquid crystal display.

FIG. 1 is a view showing the conventional UV light irradiating apparatus. In FIG. 1, the UV light generated from a UV lamp 1 is focused by a lens 2 and then linearly polarized by a polarizer 3. These elements are arranged in a line with a substrate 4. The substrate 4, coated with an alignment layer 5 that can be photo-reacted, is exposed by the circular spot of the UV light, so that a pretilt is given to the alignment layer 5 formed on the substrate 4.

Irradiating UV light to the alignment layer 5 by the conventional UV irradiating apparatus, however, is limited by the size of the UV lamp 1, so the exposed circular area 6 on the alignment layer 5 is also small as shown in FIG. 2a. In addition, to get a uniform pretilt on the alignment layer 5, the available alignment layer size is smaller than the area corresponding the plateau of the graph of FIG. 2b having a uniform photo-energy. The available alignment layer size is restricted by the size of the lamp.

Accordingly, it is difficult to employ this UV irradiating apparatus for a large size liquid crystal display. In addition, there is a problem that the UV light cannot be uniformly irradiated into the entire alignment layer. As a result, the absorbed energy on the whole alignment layer is not uniform.

SUMMARY OF THE INVENTION

It is an object of the present invention to provide an ultraviolet light irradiating apparatus for a photo-alignment process which can be adopted in large size liquid crystal displays.

It is another object of the present invention to provide a method for irradiating the ultraviolet light into the alignment layer to provide a uniform photo-energy amount absorbed into the alignment layer for large size liquid crystal displays.

In order to achieve these objects, a UV irradiating apparatus includes a UV lamp generating the UV light, a lens, a polarizer in which the UV light is linearly polarized, and a substrate coated with an alignment layer including a photo-reacting polymer such as polysiloxane based materials. The UV lamp, the lens, and the polarizer are arranged in a line, above the substrate. The UV light is irradiated into the substrate at a certain angle with respect to the substrate. Accordingly, the alignment layer is exposed by an elliptical spot of UV light larger than the conventional exposed area.

Further, the UV lamp, the lens, and the polarizer are mounted into a casing and moved above the substrate by a scan motor to scan the whole area of the alignment layer uniformly. In that time, the irradiated spot of light is moved out of the alignment layer to provide uniformity to the peripheral alignment layer. After irradiating to the end of one line, the spot of light is moved to the next line, where the distance between adjacent lines is within 5 mm to guarantee beam uniformity. Thereby, the photo-energy amount absorbed into the whole alignment layer is uniform.

BRIEF DESCRIPTION OF THE DRAWINGS

FIG. 2a is a plan view showing the spot of the UV light irradiated into the alignment layer when the conventional UV light irradiating apparatus of FIG. 1 is used.

FIG. 2b is a graph showing a photo-energy amount according to the alignment layer area of FIG. 2a.

FIG. 4b is a graph showing a photo-energy amount according to the alignment layer area of FIG. 4a.

FIG. 6b is a graph showing a photo-energy amount according to the alignment layer area of FIG. 6a.

DETAILED DESCRIPTION OF THE INVENTION

Figure 1:
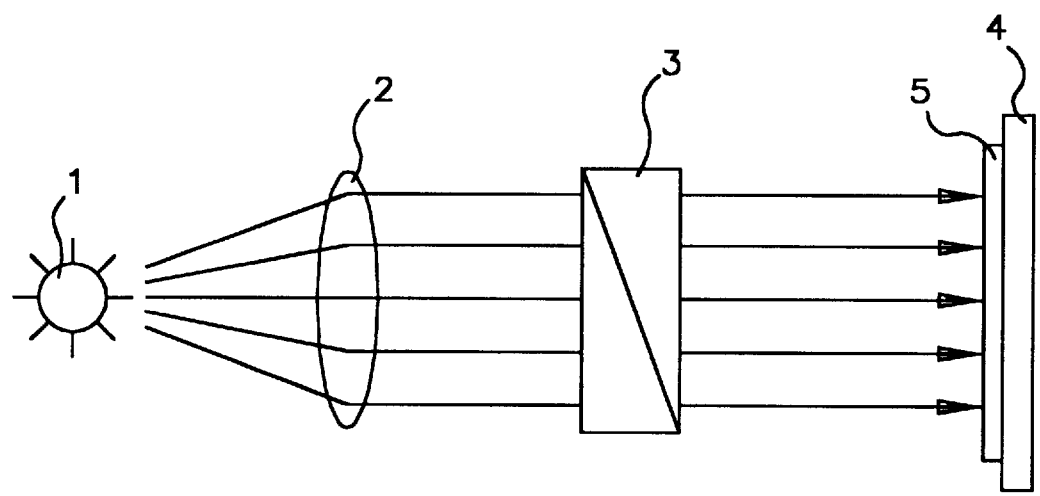
FIG. 1 is a view showing the conventional UV light irradiating apparatus for a photo-alignment process.
Figure 3:
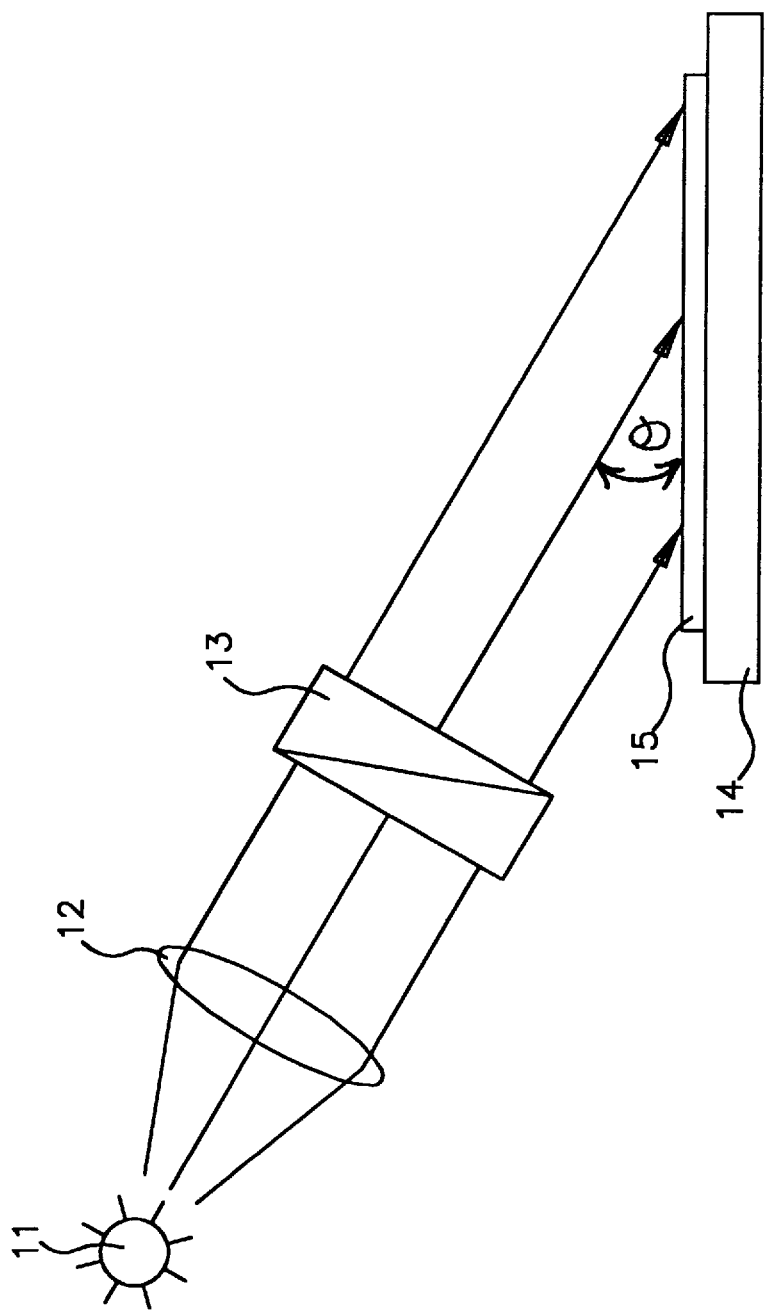
FIG. 3 is a view showing a first embodiment of the UV light irradiating apparatus consistent with the present invention.
Figure 4A:
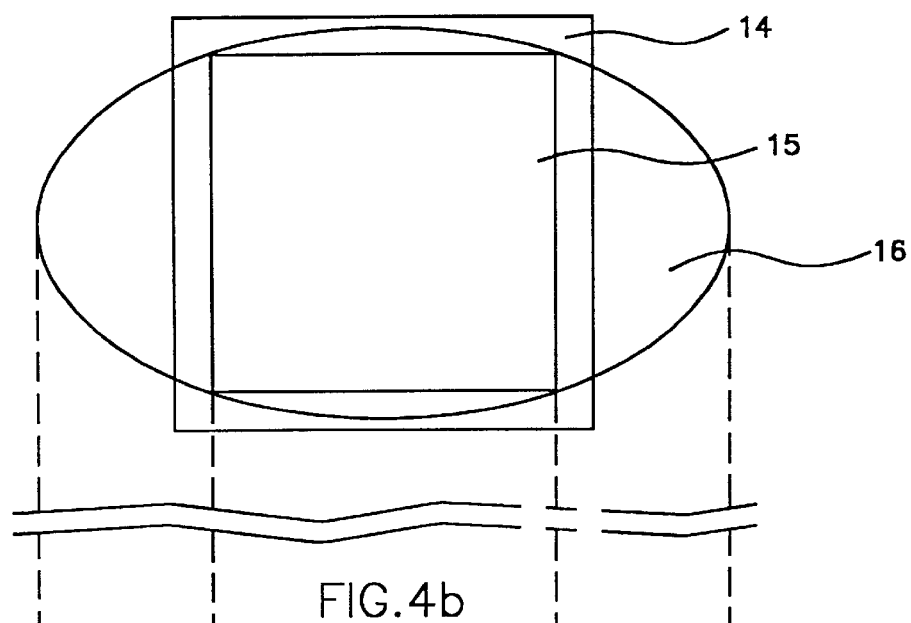
FIG. 4a is a plan view showing the spot of the UV light irradiated into the alignment layer when the UV light irradiating apparatus of FIG. 3 is used.

FIG. 3 is a view showing a first embodiment consistent with the present invention. The UV light is generated from a UV lamp 11, such as a Hg lamp, and focused by a lens 12. This focused UV light is polarized by a polarizer 13 and irradiated to a substrate 14 on which a photo-reacting alignment layer 15, which includes polysiloxane, is coated. The UV lamp 11, the lens 12, and the polarizer 13 are arranged in a line and they are slanted at an angle θ with respect to the substrate 14. The alignment layer 15 coated on the substrate 14 is exposed with elliptical spot 16 of light as shown in FIG. 4a. Therefore, the exposed area 16 in the alignment layer 15 is larger than conventional area 6 as shown in FIG. 2a in accordance with the slanted angle θ. To get the larger exposed area 16, the irradiation direction is more slanted against the alignment layer 15.

Figure 4B:
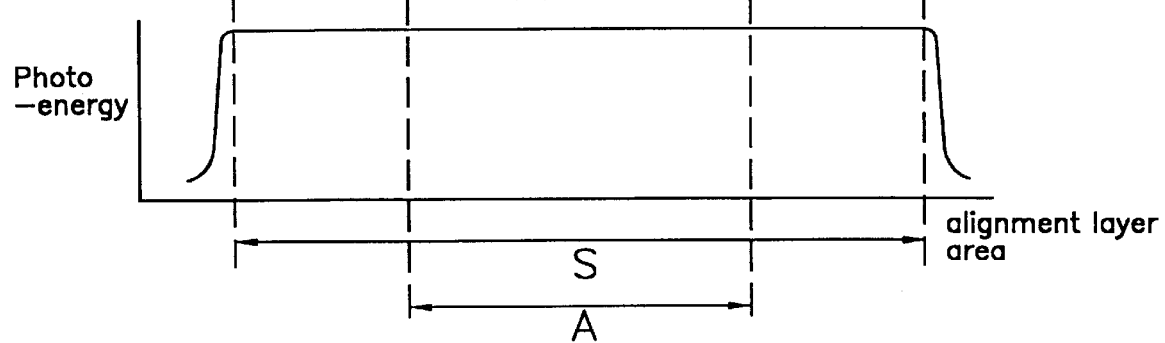

In FIG. 4b, 'S' refers to a range where the UV lamp 11 irradiates a uniform photo-energy amount, and 'A' refers to a range of alignment layer 15. The range corresponding to light spot S covers the alignment layer range A. Therefore, the elliptical spot S having uniform photo-energy exposes the whole alignment layer range A, the spot S being larger than the conventional circle light spot.

Figure 5:
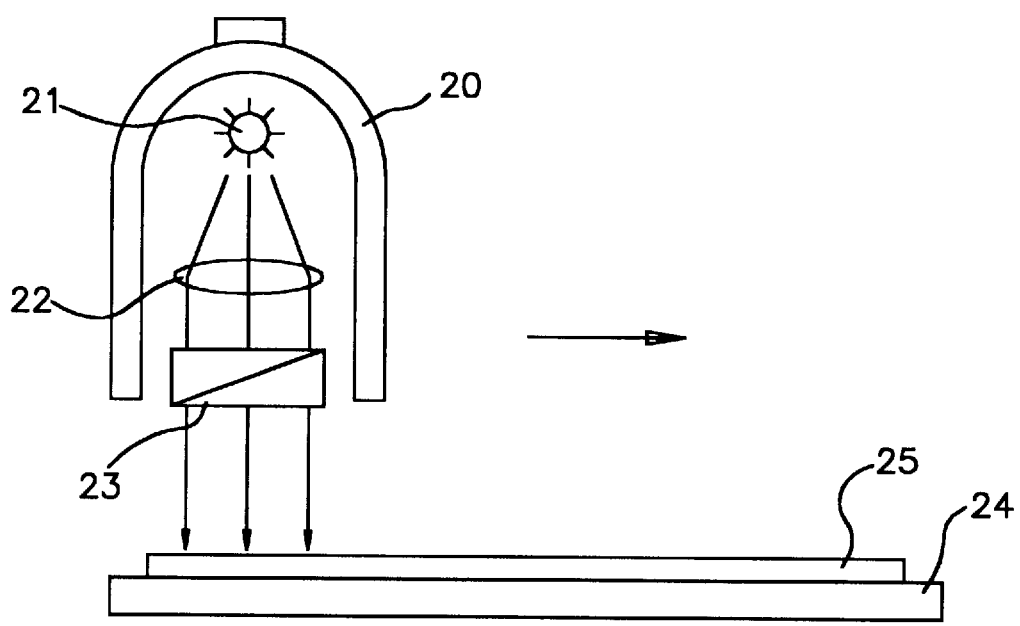
FIG. 5 is a view showing a second embodiment of the UV light irradiating apparatus consistent with the present invention.

FIG. 5 is a view showing a second embodiment consistent with the present invention. In this embodiment, a UV lamp 21, a lens 22, and a polarizer 23 are mounted into a casing 20. A scan motor (not shown) moves the casing 20 above a substrate 24 coated with photo-reacting alignment layer 25 to scan the whole area of the alignment layer 25. Therefore, the whole area of the substrate is uniformly exposed by the moving UV light and given a uniform photo-energy amount, so that a pretilt determined on the alignment layer is uniform.

Figure 6A:
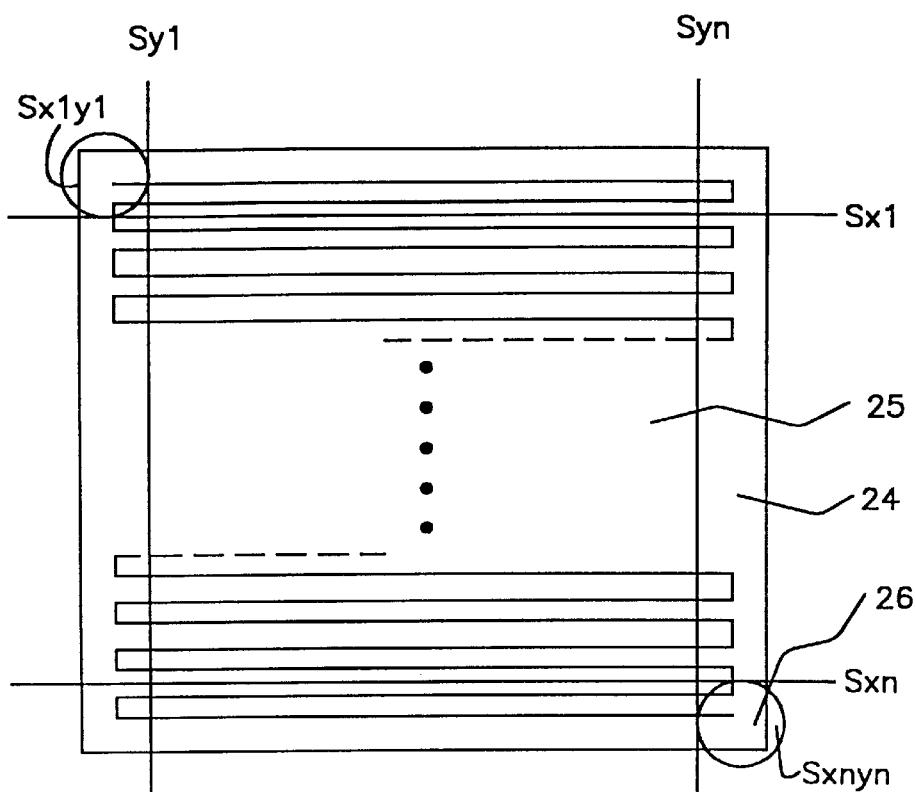
FIG. 6a is a plan view showing the exposed area of the UV light irradiated into the alignment layer when the UV light irradiating apparatus of FIG. 5 is used.

One method for scanning the UV light into the alignment layer 25 is shown in FIG. 6a. If the irradiating direction is in the perpendicular direction to the substrate, the light spot 26 is circular. However, the irradiation direction may be oblique to the substrate. The start spot $S_{x1y1}$ for irradiating UV light is a tangent between extension lines from a first horizontal line $S_{x1}$, and a first vertical line $S_{y1}$ of the alignment layer 25. In addition, the end spot $S_{xnyn}$ for irradiating UV light is a tangent between extension lines from a last horizontal line $S_{xn}$ and a last vertical line $S_{yn}$ of the alignment layer 25.

More particularly, the light spot 26 begins moving from start spot $S_{x1y1}$ along the first horizontal line $S_{x1}$ until it contacts outside the last vertical line $S_{yn}$. Then, the light spot 26 moves down along the last vertical line $S_{yn}$ in an interval retaining beam uniformity, such as 5 mm. In the second line $S_{x2}$, the spot moves in the reverse direction to the previous moving direction. The light spot 26 of UV light continuously moves until it meets the last spot $S_{xnyn}$ in the last horizontal line $S_{xn}$. Thereby, every area in the alignment layer 25 is exposed with the same amount of UV light from light spot 26.

Figure 6B:
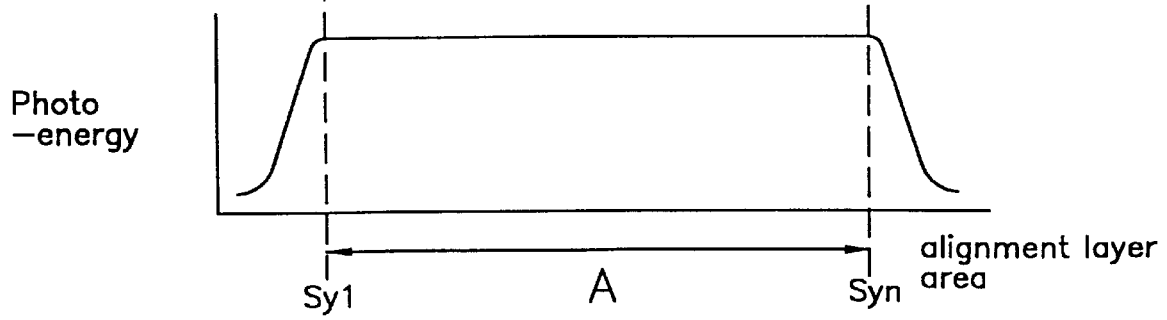

The photo-energy absorbed into the range A of the alignment layer 25 is uniform, as shown in FIG. 6b, because the spot is overlapped in the same times by the movement of the scan motor. Thereby, a large size liquid crystal display can be fabricated.

Although in these embodiments the polarized light is used to provide photo-energy onto the alignment layer, unpolarized light can be adopted simply by removing a polarizer from the irradiating apparatus.

In addition, to obtain a multi-domain liquid crystal display in which each domain has a different pretilt, the polarizer can be rotated for each corresponding domain. Thus, a domain of the alignment layer 15 has its own pretilt by which a UV light, having a different polarization direction, is irradiated just into a certain domain using the mask. The other domain is also exposed by the UV light having a different polarization direction from the initially irradiated UV light by rotating the polarizer. As a result, the multi-domain liquid crystal cell, such as two-domain or four-domain liquid crystal cell, etc, can be obtained.

In the above mentioned UV irradiating apparatus, since the UV light obliquely irradiates into the alignment layer and/or scans the whole area of the alignment layer, a wider area of the alignment layer is uniformly exposed to the UV light. Rather than move the UV light source to scan a stationary substrate, the substrate may be moved in a scanning motion relative to a stationary UV light source.

Having described this invention as related to the embodiment shown in the accompanying drawings, the invention is not limited by any of the details of description, but rather should be construed broadly within its spirit and scope as set out in the accompanying claims.

What is claimed is:

1. A photo-irradiating device for a photo-alignment process, comprising:

a substrate coated with an alignment layer;

a photo-irradiating unit for obliquely irradiating the alignment layer with a polarized light to provide a pretilt; and a scan motor mounted on the photo-irradiating unit for moving the light over the alignment layer so as to uniformly irradiate the whole area of the alignment layer while maintaining the same polarization direction.

2. A photo-irradiating device for a photo-alignment process according to claim 1, wherein the photo-irradiating unit includes a lamp for generating the light and a lens for focusing the light.

3. A photo-irradiating device for a photo-alignment process according to claim 2, wherein the lamp includes a Hg lamp for generating an ultraviolet light.

4. A photo-irradiating device for a photo-alignment process according to claim 1, further comprising:

a mask for controlling the light energy amount absorbed by each domain of the alignment layer to provide a multi-domain cell.

5. A photo-irradiating device for a photo-alignment process, comprising:

a fixed substrate coated with an alignment layer; and a movable photo-irradiating unit for irradiating the alignment layer with a polarized light to provide a pretilt depending upon the light energy amount absorbed by the alignment layer, the movable photo-irradiating unit including a scan motor for moving the movable photo-irradiating unit so as to uniformly irradiate the whole area of the alignment layer while maintaining the same polarization direction.

6. A photo-irradiating device for a photo-alignment process according to claim 5, wherein the movable photo-irradiating unit includes a lamp for generating the light and a lens for focusing the light.

7. A photo-irradiating device for a photo-alignment process according to claim 6,
wherein the lamp includes a Hg lamp for generating an ultraviolet light.

8. A photo-irradiating device for a photo-alignment process according to claim 6,
wherein the movable photo-irradiating unit further includes a casing, the lamp and the lens being mounted into the casing.

9. A photo-irradiating device for a photo-alignment process according to claim 5, further comprising:
a mask for controlling the light energy amount absorbed by each domain of the alignment layer to provide a multi-domain cell.

10. A photo-irradiating device for a photo-alignment process, comprising:
a movable substrate coated with an alignment layer, the movable substrate including a scan motor for moving the movable substrate in a regular order; and
a fixed photo-irradiating unit for irradiating the alignment layer with a polarized light to provide a pretilt depending upon the light energy amount absorbed by the alignment layer, wherein the whole area of the alignment layer is uniformly irradiated with the light while maintaining the same polarization direction.

11. A photo-irradiating device for a photo-alignment process according to claim 10, wherein the fixed photo-irradiating unit includes a lamp for generating the light and a lens for focusing the light.

12. A photo-irradiating device for a photo-alignment process according to claim 11,
wherein the lamp includes a Hg lamp for generating an ultraviolet light.

13. A photo-irradiating device for a photo-alignment process according to claims 10, further comprising:
a mask for controlling the light energy amount absorbed by each domain of the alignment layer to provide a multi-domain cell.

14. An irradiating method for a photo-alignment process, comprising the steps of:
providing a photo-irradiating unit having a scan motor for moving the photo-irradiating unit and for scanning an alignment layer with a polarized light;
generating the light;
focusing the light; and
uniformly irradiating while maintaining the same polarization direction the whole area of the alignment layer including a photo-polymer with the light in a slanted direction over the alignment layer to provide a pretilt depending upon the light energy amount absorbed by the alignment layer.

15. An irradiating method for a photo-alignment process according to claim 14, wherein the photo-polymer includes polysiloxane based materials.

16. An irradiating method for a photo-alignment process according to claims 14, further comprising the step of:
controlling a transmittance of the light before the irradiating step for providing a different light energy amount absorbed by each domain of the alignment layer to form a multi-domain cell.

17. An irradiating method for a photo-alignment process, comprising the steps of:
generating a polarized light;
focusing the light; and
scanning an alignment layer with the light, said alignment layer including a photopolymer, to provide a pretilt depending upon the light energy amount absorbed by the alignment layer, wherein the scanning step includes the step of scanning from side to side of a substrate coated with the alignment layer to uniformly irradiate the whole area of the alignment layer while maintaining the same polarization direction.

18. An irradiating method for a photo-alignment process according to claim 17, wherein the photo-polymer includes polysiloxane based materials.

19. An irradiating method for a photo-alignment process according to claim 17, further comprising the step of:
controlling a transmittance of the light before the scanning step for providing a different light energy amount absorbed by each domain of the alignment layer to form a multi-domain cell.

20. An irradiating method for a photo-alignment process according to claim 17,
wherein the alignment layer has a first vertical side, a second vertical side opposite the first vertical side, a first horizontal side being an orthogonal side of the first vertical side and the second vertical side, and a second horizontal side opposite the first at horizontal side.

21. An irradiating method for a photo-alignment process according to claim 20,
wherein the scanning step includes the substep of:
continuously scanning the light on the alignment layer along a line, starting from a first intersection of the first vertical side and the first horizontal side to a last intersection of the second vertical side and the second horizontal side, in a regular order.

* * * * *